June 25, 1929.   O. J. W. LOUGHEED   1,718,746
METHOD OF WELDING BAND SAWS
Filed Aug. 6, 1928
Fig. 1
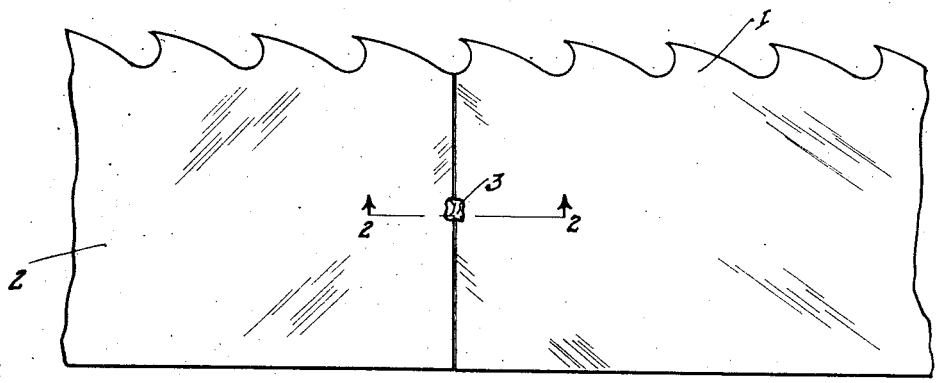
Fig. 2
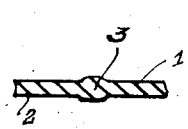
Fig. 3
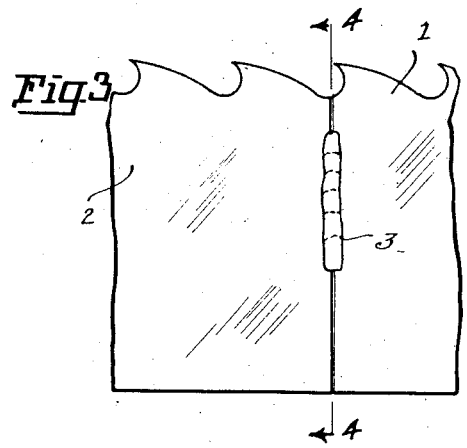
Fig. 4
Fig. 5
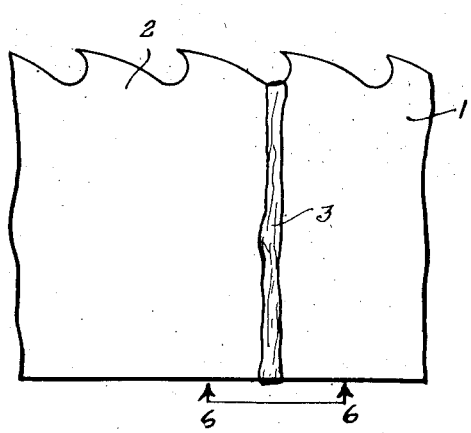
Fig. 6
Fig. 7
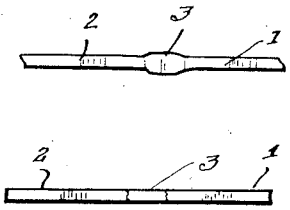
Inventor
Overend J. W. Lougheed
By Thomas Bilyeu
Attorney Patented June 25, 1929.

1,718,746

UNITED STATES PATENT OFFICE.

OVEREND J. W. LOUGHEED, OF PORTLAND, OREGON.

METHOD OF WELDING BAND SAWS.

Application filed August 6, 1928. Serial No. 297,805.

My invention relates to new and improved methods in the welding of band saws, the same being used in the repairing of band saws that have developed cracks or defects due to the operation of the same about band wheels, as well as for use in the making of a complete weld to form the saw blade into an endless unit.

Heretofore it has been the general custom to repair or weld band saws by scarfing the meeting edges and unite the joining faces by brazing. In my new and improved process of welding band saws, or the repairing of cracked adjacent surfaces, I accomplish the same without scarfing or brazing.

I accomplish the result in a manner that develops the full strength of the metal at the repaired point and do the same without scarfing the adjacent surfaces, and without the use of fluxes or spelter, and without the drawing of the temper, excepting at the immediate point of the weld. I accomplish this result by using an acetylene torch, using a head or tip that is adapted to a fine adjustment and fuse the adjacent surfaces on oppositely disposed sides of the saw as a continuous progressing operation and use a welding rod of fine material, as a high grade piano wire, the size of the wire depending on the thickness of the blade to be welded to supply the extra material required to form the weld. I hammer the same during cooling and temper the blade after the weld has been completed.

The primary objects of my invention consist in providing simple and efficient methods adapted to the welding of band saws that will develop the full strength of the steel and one that will be adapted to being run over the band wheels after the same has been welded for relatively long periods.

Still further objects of my invention consist in providing methods for the welding of band saws that are efficient and that may be carried out without the necessity of scarfing the meeting ends and methods that do not require brazing compounds, fluxes and the like in the making of the weld.

And still further objects of my invention consist in providing methods for the welding of the larger sizes of band saws that will result in a weld that will not break or crack at the point of the weld when the welded saw is used in actual practice and where large horse power is required in the operation of the saw.

Illustrating the step taken in following out my method, reference is had to the accompanying drawings, in which:

Fig. 1 is a top, plan view, of adjacent saw edges to be welded.

Fig. 2 is a sectional, side elevation, taken on line 2—2 of Fig. 1, looking in the direction indicated.

Fig. 3 is a top, plan view, of the welded seam being made as the weld progresses from the center outward.

Fig. 4 is a sectional, end elevation, taken on line 4—4 of Fig. 3, looking in the direction indicated.

Fig. 5 is a top, plan view, of the completed weld before the same has been ground to the original thickness.

Fig. 6 is an edge view, taken on line 6—6 of Fig. 5, looking in the direction indicated.

Fig. 7 is an edge view of the completed weld after the grinding operation.

In the drawings, like reference characters refer to like parts throughout the several views.

1 and 2 are adjacent blade elements that are adapted to being welded together by my new and useful process.

Where a complete weld is to be made of adjacent surfaces, the same are matched together with parallel surfaces preferably with the full thickness of the adjacent pieces for the full width of the saw, thus forming a complete butt weld. Preferably I join or meet the surfaces to be welded and at a point midway the edges. Upon one side thereof, I fuse a surface 3, of a width relatively narrow as compared to the full width of the meeting blade to be welded and as the same cools, I hammer the same with a relatively light hammer. I then turn the members to be welded over and fuse a point on the oppositely disposed sides of approximately the same width and hammer the same with the same relatively light hammer as it cools. I then turn the blade members over again and fuse a spot adjacent the one theretofore fused of about the same thickness and hammer the same during cooling. This operation is repeated from side to side until the adjacent elements have been welded to one edge. I then start at the center position again and work to the oppositely disposed edge until the members have been welded together. After the seam has been completely fused, I then warm the full width of the seam and hammer the same with a heavier hammer, after which I grind the seam and the adjacent blade members to the approximate thickness of the blade to be united, after which I use the torch for tempering the blades to the approximate normal hardness of the original blade members. No fluxes or spelter or other fusing agents are used in the welding process.

While the process herein described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. A method of welding band saws, consisting in abutting the surfaces to be welded, fusing relatively small areas alternately at opposite sides of the meeting sufaces to be welded, hammering each fused surface during cooling and finally tempering the welded surfaces.

2. A method of welding band saws consisting in abutting the surfaces to be welded, fusing relatively small areas of each meeting surface simultaneously with an acetylene torch, and progressing by fusing alternate sides of the surfaces to be welded and hammering each fusing as it cools, added material being supplied each fusing, from a fine welding rod, the heating of the entire weld after the completion of the same, the hammering of the weld and finally tempering the completed weld.

3. A method of welding band saws consisting in fusing small areas of each meeting surface from alternate sides, the hammering of each fusing during cooling and the supplying of added material from a relatively small welding rod, the heating of the weld when completed and the hammering of the same during cooling, and the grinding of the weld to a uniform thickness of the original blade and finally tempering the surface to the hardness of the original blade.

4. A method of welding band saws, consisting in fusing small areas of each meeting surface, first from one side and then from the opposite side of the blade, at the same point, beginning the fusing at a point substantially midway the longitudinal edges of the blade, adding fused material from a welding rod of fine piano wire, the hammering of each of the fused areas during cooling, the heating and hammering of the total weld when completed and finally the tempering of the completed weld.

OVEREND J. W. LOUGHEED.